Oct. 23, 1934.  H. E. HOLLMANN  1,978,021
ULTRASHORT WAVE SYSTEM
Filed Jan. 27, 1932   3 Sheets-Sheet 1
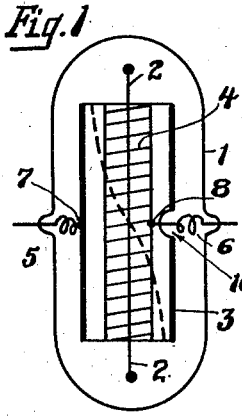
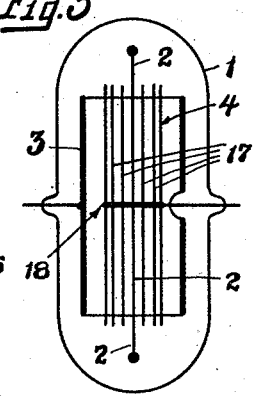
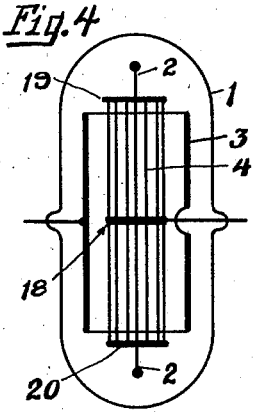
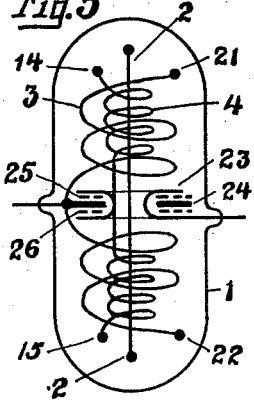
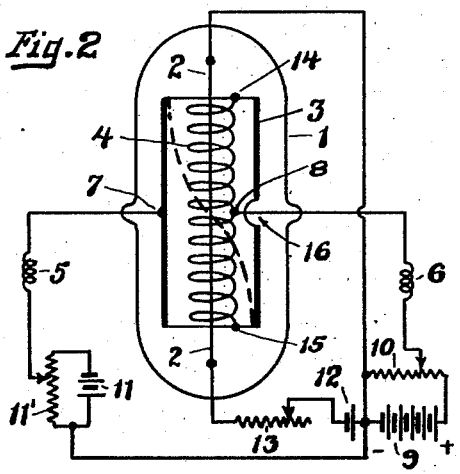
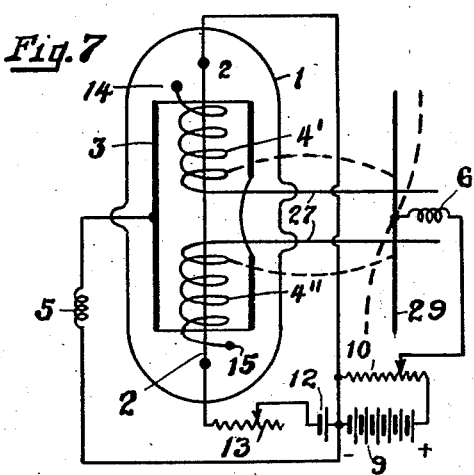
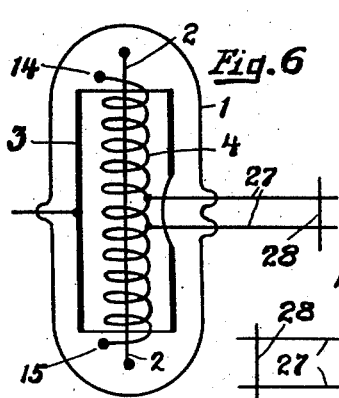
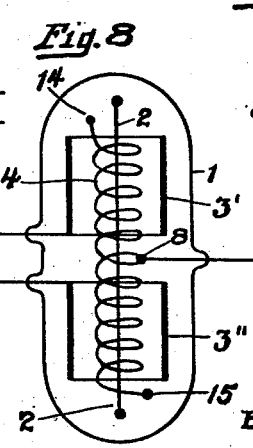
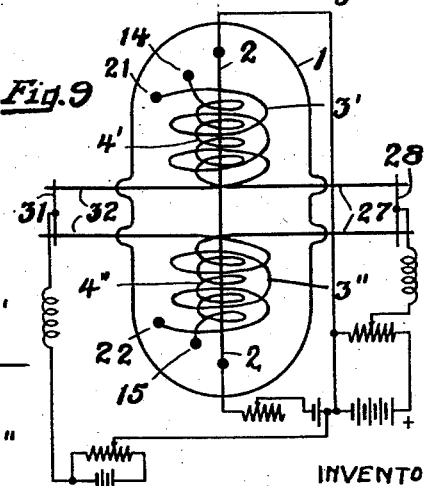
INVENTOR
Hans Erich Hollmann
ATTORNEY Oct. 23, 1934.  H. E. HOLLMANN  1,978,021
ULTRASHORT WAVE SYSTEM
Filed Jan. 27, 1932  3 Sheets-Sheet 2
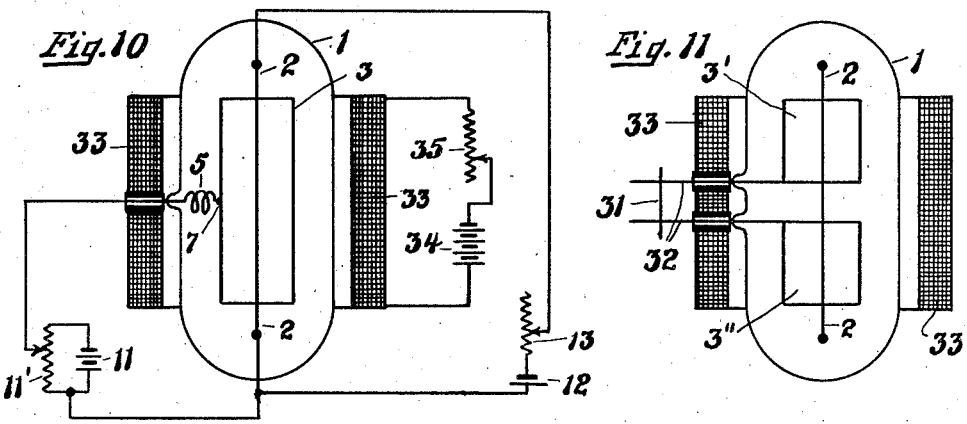
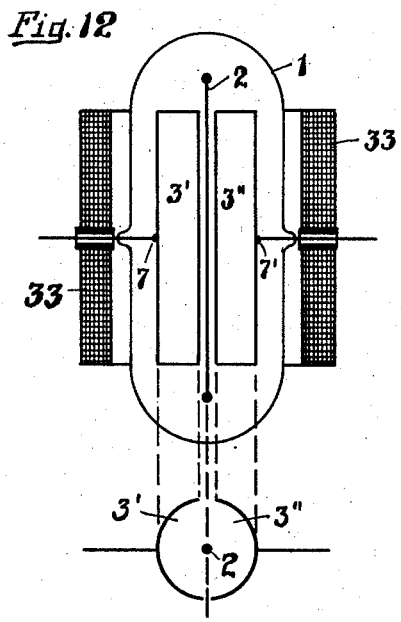
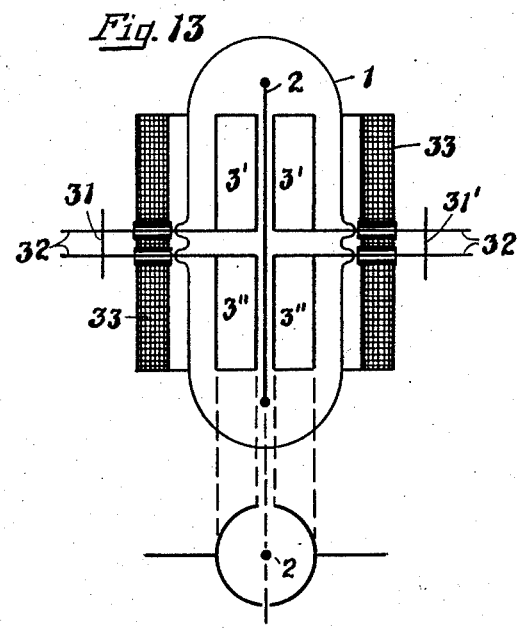
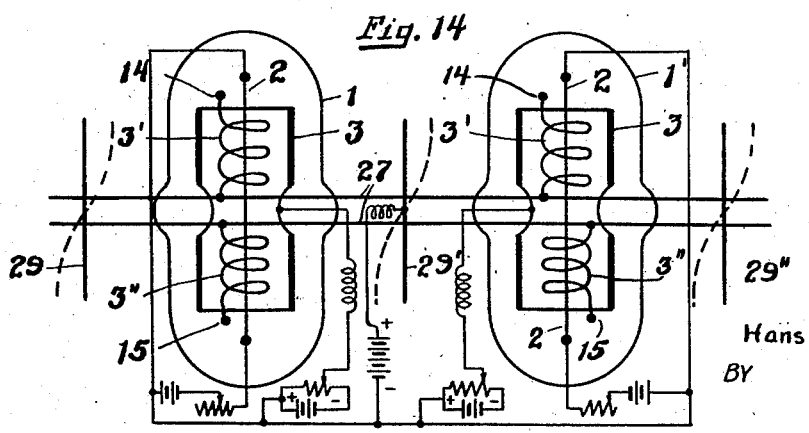
INVENTOR
Hans Erich Hollmann
BY
ATTORNEY Oct. 23, 1934.  H. E. HOLLMANN  1,978,021
ULTRASHORT WAVE SYSTEM
Filed Jan. 27, 1932  3 Sheets-Sheet 3

INVENTOR
Hans Erich Hollmann
BY
ATTORNEY

Patented Oct. 23, 1934

1,978,021

UNITED STATES PATENT OFFICE 1,978,021

ULTRASHORT WAVE SYSTEM

Hans Erich Hollmann, Berlin-Charlottenburg, Germany, assignor, by mesne assignments, to American Telephone and Telegraph Company, a corporation of New York Application January 27, 1932, Serial No. 589,173
In Germany October 13, 1930

9 Claims. (Cl. 250—36)

My invention relates to ultra-short wave systems and more particularly to ultra-short waves known also in the art as microwaves; that is, electric oscillations having a wave length of the order of a few decimeters down to a few centimeters and less.

It is the primary object of the invention to provide an ultra-short wave system for producing undamped electric oscillations of the shortest possible wave length by means of electric discharge tubes known in the art.

A more specific object of the invention is the provision of a short-wave discharge tube in which the resonance system determining the frequency of the oscillations is constituted by the operating electrodes of the tube itself.

Another object of the invention is to directly excite, by an electric discharge beam, an open resonance system serving at the same time as an operating electrode in a discharge tube.

In accordance with the well-known methods of producing electrical oscillations, oscillatory circuits are used including concentrated reactance elements such as capacities and self-induction coils. The natural oscillation frequency of such a device, as is well known, is determined by the circuit constants; that is, the inductance and capacity. Initial free oscillations started in such a circuit may be maintained by associating with it a regeneratively coupled amplifier, or a device exhibiting what is known as a negative or drooping resistance characteristic.

In both the regenerative amplifier circuit and the negative resistance device circuit the natural oscillations are maintained by introduction of energy compensating the heat losses in the circuit, thus preventing a damping of the oscillations.

Oscillations of this kind are known as quasi-stationary oscillations in that for a given instant the intensity of the oscillating current is equal at any point throughout the circuit system. By decreasing the wave length of the oscillations produced according to the above method, it is readily seen that the dimensions of the circuit will shrink more and more until a limit is reached of the shortest possible wave length that may be produced in a vacuum tube when the capacity and self-inductance presented by the electrodes of the tube itself and of the shortest possible connecting leads, respectively, determine the constants of the oscillatory circuit. In this manner, it is possible to produce electric oscillations down to a few meters wave length.

A further decrease of the wave length to the order of less than about one meter can be secured by causing the discharge carriers within a discharge device themselves to carry out oscillatory movements and applying the oscillating energy to a closed circuit of the non-stationary type such as a two wire tuning system, known also in the art as Lecher wire system.

A well-known apparatus operating in this manner for producing ultra-short waves is known in the art as the braking field or Barkhausen circuit comprising a vacuum tube having cathode, grid, and anode electrodes of usual construction whereby the grid, contrary to the customary practice, carries a highly positive potential, the anode being operated at zero or slightly negative potential with regard to the cathode. In such a system, electric discharge carriers or electrons emitted from the cathode or filament electrode and attracted by and accelerated towards the positive grid electrode will partly pass the meshes of the latter and run against the opposing anode potential in such a manner that their movements will be reversed. The electrons are thus returned to the grid and the result of the entire discharge beam is a reciprocating movement at ultra-high frequency determined by the operating potentials and the length of the interelectrode oscillating space. In order to stabilize these electron movements it has been found necessary to connect a tuning system of the non-stationary type comprising two parallel wires, (such as a Lecher wire system), to the tube which has the further effect of increasing the oscillating energy of the discharge beam.

As is well known, such nonstationary wire systems differ from ordinary oscillatory circuits consisting of concentrated reactance elements such as condensers and inductance coils, in that the current intensity at a certain instant of time has different values at different points of the system in such a manner that standing voltage and current waves are produced along the system dependent upon the physical dimensions of the system. Such nonstationary tuning systems, on the other hand, have in common with the quasi-stationary systems above mentioned, that the energy of the oscillations is confined to the system or, in other words, the system is closed upon itself. In order to radiate the oscillating energy into space, it is necessary to connect an open or radiating arrangement such as, for instance, a dipole antenna, to the closed system carrying the oscillatory energy, as is well known in the art.

In this manner, it has been possible to produce wave lengths of less than one meter down to the order of several decimeters. If it is desired to still further decrease the wave length, it is found that the electrical dimensions of the oscillating system are limited by the mechanical dimensions of the tube electrodes which in range of the decimeter waves form an essential part of the resonance system. The oscillations cannot be decreased beyond this limit without entailing a considerable decrease of the available oscillating energy.

Accordingly, it is an object of the present invention to permit a further decrease of the wave length. The basic principle of the invention resides generally in utilizing the operating electrodes of the tube as open oscillators for example as dipole systems directly excited by the discharge beam.

It is obvious that direct excitation of an open or dipole system constituting at the same time an operating electrode of the tube, entails the advantage of increased efficiency and absence of local energy losses produced in a closed generating circuit.

Certain aspects of the invention, as will be readily understood, are applicable to any system of producing ultra-short electric waves of the order under discussion and are in no way limited to the Barkhausen system. The explanation given regarding the reciprocating electronic movement within the discharge path of the tube is to be regarded as a working hypothesis rather than a definite and final explanation of the physical phenomena taking place in the tube. In fact, it was found that a so-called diode or tube having only two electrodes, that is, a cathode and a cooperating electrode, is also able under certain conditions to produce an ultra-high frequency oscillation of this kind.

Accordingly, another explanation of this phenomena has been given based upon the presence of a certain residual amount of gas within the tube whereby ionization takes place in such a manner that through mutual control of the electron discharge and the ionic discharge, respectively, a reciprocating movement is obtained after an initial excitation has taken place such as by the first impact of the electron beam emitted by the cathode electrode.

Other objects and aspects of the invention will be apparent upon consideration of the following detailed description taken with reference to the accompanying drawings in which I have illustrated a number of tubes and circuits embodying the invention.

I wish it to be understood, however, that the specific description and the drawings are to be regarded as illustrative and explanatory only of the underlying principle of the invention which, as will become obvious, is subject to many variations and modifications coming within its broader scope and spirit such as expressed in the appended claims.

Figure 1 shows a vacuum tube used in a Barkhausen short wave system embodying the principle of my invention.

Figure 2 shows a similar tube included in an operating system for producing oscillations of extremely small wave length in accordance with the invention.

Figure 3 and Figure 4 show modifications of the tube according to Figure 1.

Figure 5 shows a further modification of the tube according to Figure 1.

Figure 6 illustrates a tube in accordance with the previous figures to be used in a transmitting as well as in a receiving system and being provided with means for utilizing the oscillating energy such as for transmitting or receiving radiant energy.

Figure 7 illustrates a system for utilizing a tube in accordance with Figure 6.

Figure 8 illustrates another modification of the tube according to Figure 6.

Figure 9 shows a tube according to Figure 6 with electrodes corresponding to Figure 5.

Figure 10 shows another example of an ultrashort wave vacuum tube according to my invention, utilizing a magnetic field.

Figure 11 shows a modification of the tube according to Figure 10.

Figure 12 shows a further modification of the tube according to Figure 10.

Figure 13 illustrates a tube including the combined features of Figure 11 and Figure 12.

In Figure 14 I have shown an arrangement of a plurality of oscillating tubes of the type according to Figure 7 in a chain for the purpose of increasing the oscillating energy.

Figure 15:
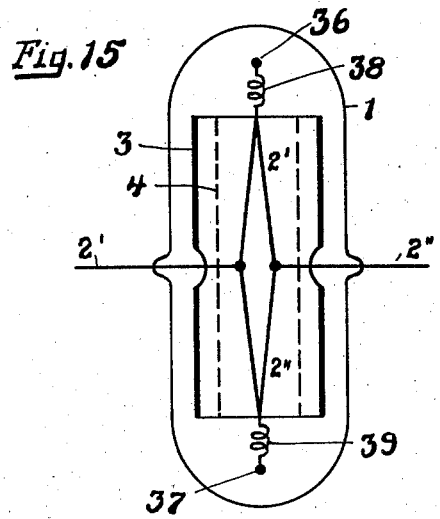

Figure 15 illustrates another example of my invention.

Figure 16:
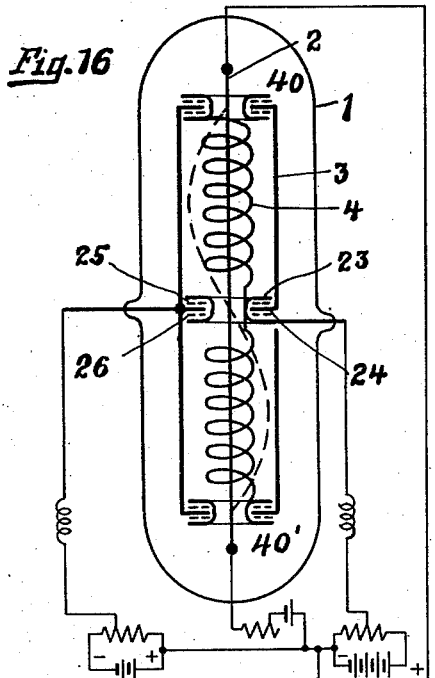

Figure 16 shows an arrangement whereby the tube electrodes may be excited by a harmonic wave instead of in a half wave as according to the previous figures.

Figure 17:
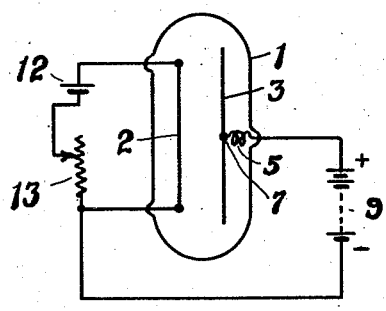

Figure 17 illustrates a tube provided with a radiating anode electrode serving as a straight dipole wire.

Figure 18:
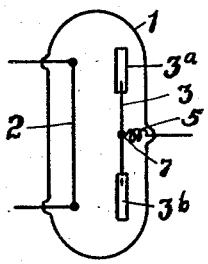

Figure 18 illustrates a modification of the tube according to Figure 17.

Figure 19:
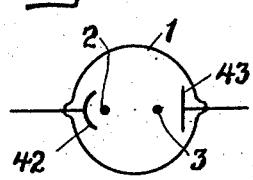

Figure 19 illustrates a further improvement of a radiating tube according to Figure 17.

Figure 20:
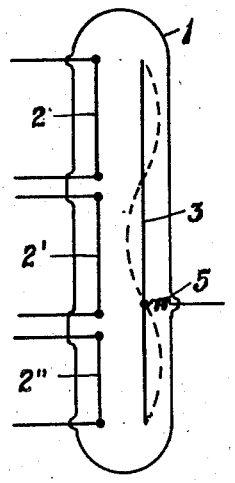

Figure 20 shows a tube of the type according to Figure 17 in which the radiating antenna is excited by a harmonic wave.

Applicant has discovered that it is possible to produce extremely short waves within any electrode surrounding the filament of a vacuum tube, preferably if the electrodes are arranged symmetrically with regard to a symmetry axis or plane.

Accordingly, the idea underlying the invention consists in directly exciting the electrodes by the discharge beam in a half wave or a multiple thereof. By supplying the operating potential at the nodal points of the oscillations according to a further feature of the invention, disturbing influences on the frequency caused by the supply leads and supports for the electrodes and the like are suppressed. In this manner, the invention makes it possible to excite the electrodes of a vacuum tube itself to oscillate at shorter wave lengths than have hitherto been produced in such tubes.

Similar reference characters identify similar elements throughout the different views of the drawings.

Referring to Figure 1 of the drawings, this shows a vacuum tube of well-known design comprising a vessel such as glass tube 1, a cathode or filament 2 shown in the present case as a straight wire, and concentric anode and grid electrodes 3 and 4, respectively, surrounding the cathode. The supply leads for applying operating potential to the grid and anode are connected to symmetry or midpoints 8 and 7, respectively of the grid and anode electrodes whereby both are enabled to oscillate freely and in a half wave length as resonance or dipole systems as indicated in the drawings by the dotted line representing the distribution of the voltage wave on the grid. The operating current is supplied at the nodal point of the wave; that is, in the middle of the electrodes, the grid supply lead being passed through a corresponding opening 16 of the anode cylinder. In order to prevent the high frequency currents from entering the potential supply sources, choke coils 5 and 6 are provided which, in the present case, have been shown within the tube itself but which, as is understood and shown by Figure 2, may also be provided in the outside circuit connected with the tube. The choke coils 5 and 6 may be formed by winding-up part of the lead wires in a spiral, as illustrated.

Referring to Figure 2, this shows a circuit embodying a tube in accordance with Figure 1 operating according to the Barkhausen method for producing extremely short electric waves. For this purpose I have shown an operating battery 9 connected to a potentiometer 10 for supplying a high positive biasing potential to the grid electrod 4. I have furthermore shown a heating battery 12 in series with a variable resistance 13 for supplying heating current to the electron emitting filament 2. Furthermore, I have provided a battery 11 with a potentiometer 11' for applying a slightly negative potential to the anode electrode, although it will be found that in many cases the anode may be directly connected to the cathode and operated at zero potential with respect to the cathode. The grid electrode, according to Figure 2, has been shown as a freely suspended helix which, as is known, has a natural wave length equal to about twice the length of the helix, whereas according to Figure 1 the grid 4 has been shown consisting of a helix provided with longitudinal supporting or stiffening rods. In all cases it is preferable to use insulating supports for supporting the electrodes such as of glass, especially for the supports 14 and 15 of the freely suspended helical grid according to Figure 2. Metallic supports have the drawback of unnecessarily increasing the wave length or otherwise deleteriously interfering with the functioning and operation of the system.

Referring to Figure 3, this shows a grid electrode consisting of freely supported longitudinal members 17 mounted upon a middle supporting ring 18, serving also for connecting the potential supply lead.

Figure 4 illustrates a modification of the tube according to Figure 3 whereby the ends of the longitudinal members 17 are connected together by rings 19 and 20, respectively.

In place of a solid anode cylinder, according to Figures 1 to 4, the anode may consist of a helix or of longitudinal rods or members arranged in the same manner as the grid electrode. Thus, for instance, in Figure 5 I have shown a mode of construction according to which both electrodes are formed by helical wires. Preferably the length of both helices should be chosen to be of equal length in order to insure equal tuning. In order to fix the nodal points of the oscillations for both electrodes in the same manner and to compensate for eventual unsymmetries of the voltage distribution according to Figure 5, the grid and anode are connected by means of a blocking capacity. In the example shown, this blocking capacity is comprised of metal rings 24 and 23, the latter having a channel-like cross section and separated from ring 24 by intermediate rings 25 and 26 of insulating material such as mica or the like. The conducting ring 23 forming one armature of the condenser is connected to the mid-point of the helical grid electrode 4 and the armature ring 24 is connected to the mid-point of the helical anode electrode 3. In order to permit proper mounting of the filament 2, the ring-shaped condenser is provided with an opening of sufficient diameter. It is understood that this feature of bridging the electrodes at the nodal point may be applied to any other kind of electrode construction.

In Figure 6 I have shown an alternative device in accordance with the invention with a parallel wire system 27 directly connected to the oscillating grid at its nodal point of the oscillation for utilizing the high frequency energy and for applying at the same time operating potential to the grid electrode. This energy conduction system 27 may be bridged by means of a displaceable conductor 28 of known construction for the purpose of adjusting or tuning the wave length within certain limits.

With regard to Figure 7, I have illustrated an arrangement similar to Figure 6, providing a closer coupling of the energy conduction system 27 to the tube in which the grid electrode is divided into two symmetrical parts, 4' and 4" and the two wires of the energy conduction system 27 are connected each to an end of the parts 4' and 4" of the grid electrode, respectively. I have furthermore shown in Figure 7 a complete system for producing ultra-high frequency oscillations corresponding essentially to the circuit illustrated by Figure 2 with the omission of a special anode biasing battery which, as pointed out, may be dispensed with in many practical cases without impairing the results obtained. Figure 7, furthermore, illustrates an antenna wire or dipole 29 connected to the conduction system 27 at a distance of one-half wave length from the grid, said antenna also having a length equal to one-half wave length or a multiple thereof for radiating the oscillatory energy into space for signalling transmission. The voltage distribution of the system is indicated in dotted lines.

With reference to Figure 8, this shows an analogous construction to the tube according to Figure 6 whereby the anode cylinder is sub-divided into two symmetrical parts, 3' and 3", which are connected to separate ends of the energy system 27, as shown.

In Figure 9 I have illustrated an arrangement combining the two modes of construction according to Figures 6 and 8, respectively, the construction of the electrodes otherwise corresponding to the embodiment according to Figure 5. Two conduction wire systems 27 and 32, respectively, are connected to the concentric helical shaped grid and anode electrodes, adjusting conducting bridges 28 and 31, respectively, being provided in exactly the same manner as described in connection with Figures 6 to 8. This embodiment according to Figure 9 has the advantage of increased stability of the electron beam oscillations and consequently of increased efficiency and oscillating energy power output of the tube. In an analogous manner to the examples described, the idea underlying the invention may be applied to any kind of tube, such as two-electrode or multiple electrode tubes.

Figures 10 and 11 illustrate the invention as embodied in discharge tubes known as magnetron tubes in which, in place of a control or grid electrode, a magnetic control field is provided produced by a magnet coil represented in the drawings by 33. Preferably this magnet coil is arranged concentrically to the tube in such a manner that the magnetic lines of force are substantially parallel to the axis of the anode cylinder 3. However, under some circumstances it may be preferable to arrange the magnet coil so as to produce magnetic lines of force at a definite angle to the axis of the cylindrical anode.

I have also shown in Figure 10 a battery 34 in series with a variable resistance 35 for properly adjusting the field strength of the magnet system. By furthermore providing a proper anode biasing potential as by means of a battery 11 in connection with the potentiometer 11' in a manner similar to the system described in Figure 2, ultra-high frequency reciprocating movements of the electron beam may be produced through a kind of braking action or deviation exerted by the magnetic field upon the electrons emitted from the filament 2. In Figure 10 the anode lead is connected to a symmetry or mid-point of the anode corresponding to the constructions of the previous figures and in accordance with the novel feature of the invention, so as to enable the anode electrode to oscillate freely in a half-wave length, as an open resonance system.

According to Figure 11 the anode is sub-divided into two parts, 3' and 3", connected to an energy conduction system 32 with an adjusting bridge 31 in a manner similar to the previous arrangements.

Figure 12 illustrates a further alternative in that the anode cylinder is divided into two parts. 3' and 3", in length-wise direction, thus producing two anode electrodes of semi-circular cross section, each of which is to be isolated completely and is provided with means for applying the operating potential at its mid or symmetry point to be able to freely oscillate in a half-wave length.

Figure 13 constitutes a combination of the arrangements according to Figures 11 and 12, showing the anode cylinder sub-divided in a length-wise as well as in a cross-wise direction resulting in four separate parts corresponding pairs of which are connected to the free ends of energy conduction systems 32 and 32' correspondingly in accordance with the feature of previous arrangements, such as of Figure 9.

In order to permit a plurality of ultra-short wave discharge tubes as described to cooperate for the purpose of increasing the oscillating energy output, I have shown an arrangement according to Figure 14 in which a plurality of individual tubes are connected to a common energy conduction system in such a manner that all of the tubes contribute their individual oscillating energy portions of the conduction system which may be connected to an antenna or similar utilization circuit, such as shown for instance in Figure 6. The tubes according to Figure 14 are preferably of the type as described by Figures 7, 8 and 9 to facilitate an easy connection to the common energy conduction system. In this manner, a large number of tubes may be connected to add up their individual energies for obtaining any desired amount of the resultant oscillating output energy.

It is furthermore possible, by providing a plurality or array of antenna wires such as at 29, 29' and 29" properly spaced by one-half or one-quarter wave length or a multiple thereof, to obtain a directive effect of the energy radiated by the system whereby the arrangement permits the construction of an efficient and simple directive radiation system for both transmitting and receiving ultra-short wireless waves.

In accordance with the previous constructions, the cathode has been shown as a co-axial wire. According to a further feature of the invention as illustrated by Figure 15, the cathode is given the form of a dipole being divided into two V-shaped parts, 2' and 2" connected in parallel at the symmetry or nodal point to which the heating current is supplied. Both filament ends are suspended from isolated supports 36 and 37, respectively, and are held under tension by means of helical springs 38 and 39, respectively.

In accordance with the embodiments as hereto described, the electrodes of the tubes are constructed and arranged so as to oscillate approximately in half-wave lengths; that is to say, the free ends carry a voltage maximum. However, it is also possible in accordance with a further feature of the invention, to excite the electrodes in such a manner as to enable oscillation in a harmonic wave length whereby nodal points of oscillation occur at the free ends such as shown in Figure 16 by the dotted line representing the potential wave or distribution on the grid electrode. In order to definitely determine this condition, it has been found advantageous, according to another feature of the invention, to bridge the ends of the electrodes by means of blocking condensers 40 and 40' of ring shape and similar construction, to the condenser 23 connecting the mid or symmetry points of the anode and grid and described in detail in connection with Figure 5. The electrodes may furthermore be connected at their middle or symmetry point by a condenser 23, as previously described, or the mid points may be left free or they may be separated for the connection of an energy conduction system as described in connection with the previous arrangement as will be readily understood.

Referring to Figure 17, I have illustrated another mode of construction of an oscillating tube according to the invention in which a wire shaped anode arranged to oscillate in a half-wave is provided and which directly serves for radiating the oscillating energy into space for signalling transmission or other like purposes. The antenna 3 by being directly exposed to the electron beam emitted from the filament 2, is very easily excited to oscillate and to directly radiate the energy without the necessity of connecting it to a closed auxiliary system. Thus, undesired losses are decreased to a minimum and the smallest possible wave lengths so far produced by electric discharge tubes are obtained.

Figure 17 illustrates a diode tube which included an incandescent cathode 2 and an anode 3 being arranged opposite the cathode and having the form of a dipole antenna. The cathode receives its heating current from the battery 12 and the anode is given a negative biasing voltage by means of the battery 9. Choke coil 5 which may consist of spiral winding of the anode lead wire is provided for the purpose as hereinbefore described. In order not to interfere with the dipole oscillations, the lead wire for supplying the anode potential is connected with the mid or symmetry point of the anode which consequently will be a nodal point of the oscillations. The two dipole halves oscillate in opposite phase and the wave length radiated is about twice the length of the dipole.

In some cases when it is desired to vary the wave length within certain limits, an arrangement may be used as shown by Figure 18 in which the ends of the dipole anode are provided with displaceable thin wire tubings 3a and 3b which may be adjusted from the outside by means of a magnet for the purpose of varying the length of the dipole antenna and of the wave radiated from the tube.

Referring to Figure 19, I have shown the dipole tube according to Figures 17 and 18 in cross section schematically with a screen electrode 42 being provided behind a cathode at the side opposite from the anode for the purpose of concentrating the electron beam emitted from the filament. This action may still further be increased by applying a proper biasing potential to the screen electrode 42 which is preferably determined by experiment. According to a further feature of the invention, a braking electrode 43 may be arranged cooperating with the anode 3 at the opposite side from the cathode whereby a suitable biasing potential with respect to the cathode is provided. By virtue of the braking action of the anode, electrons emitted from the cathode will move to the anode for the most part not directly but are forced to travel along a curved orbit within the tube. In order to assist these movements, the tube may be operated in a magnet field in a manner similar to that shown in the previous Figures 10 to 13 with the magnetic lines either being parallel to the cylindrical axis of the tube or including an angle as the case may require.

In Figure 20, I have shown an arrangement according to which the dipole anode is excited in a harmonic wave. In this case the operating potential is supplied at the point having a distance from one end of the anode equal to one-third of its entire length whereby a nodal point is produced at this point such as shown by the dotted line in the figure representing the voltage wave along the anode. The entire length of the anode when excited in a harmonic wave is equal to a multiple of one-half wave length. Preferably in this case when the anode is excited in a harmonic wave the filament is sub-divided into a plurality of individual parts such as 2, 2', 2", as shown, which may be supplied from the heating current source either in parallel or in series, as is well understood.

I claim:

1. In an electric discharge device comprising a sealed container, a plurality of concentric electrodes each effectively constituting a resonance system, the outer of said electrodes comprising a cylindrical anode substantially enclosing the others of said electrodes, a source of electrons for said container, means connected to said source of electrons and to the mid-portions of said electrodes to supply suitable polarizing electromotive force therebetween whereby said resonance systems are excited at their natural frequency, said mid-connection points becoming oscillation nodes and an external high frequency circuit connected to two of said mid-connection points whereby the connecting leads between the external high frequency circuit and the resonance systems within said container are reduced to a minimum.

2. An electric discharge device according to claim 1, characterized in this, that another concentric electrode is of cylindrical helical form.

3. An electric discharge device comprising electrodes, means for producing an electric discharge therebetween, one of said electrodes being divided at its mid-point in two separate parts, and a Lecher resonance system having its two conductors each connected to one of said parts.

4. In an electric discharge device in accordance with claim 3, characterized in this, that said divided electrode is concentrically arranged with respect to said other electrode.

5. An ultrashort wave source comprising an electric discharge device having a cathode, an anode and a grid, said grid being divided at its mid-point in two parts, a two-wire Lecher conductor system connected to said parts, and means for applying to said grid over the conductors of said Lecher system a polarizing potential which is positive with respect to that of said cathode.

6. An ultrashort wave system comprising a plurality of sources of the type described in claim 5, characterized in this, that a common Lecher conductor system is connected to the grids of all of said sources.

7. A short wave source comprising an electron discharge device having a cathode, an anode and a control element, said anode being divided at its mid-point into two separate parts, means for polarizing said anode and for polarizing said control element each with respect to said cathode, and a Lecher conductor system having its two conductors connected respectively to the two parts of said anode.

8. A short wave source of the type defined in claim 7, characterized in this, that said control element is a grid concentric with said cathode.

9. A short wave source comprising a sealed container including a cathode, an anode and a grid, said anode and said grid each constituting linear resonance systems, means for polarizing said anode and for polarizing said grid each with respect to said cathode, and means to connect said anode and said grid at substantially their respective mid-points to external circuits, one of said connecting means comprising a Lecher conductor system.

HANS ERICH HOLLMANN.